Patented Oct. 19, 1948

2,451,999

UNITED STATES PATENT OFFICE 2,451,999

HYDRAULIC FLUIDS

Kenneth E. Walker, Wilmington, Del., assignor to E. I. du Pont de Nemours & Company, Wilmington, Del., a corporation of Delaware No Drawing. Original application September 27, 1941, Serial No. 412,609. Divided and this application September 28, 1944, Serial No. 556,294

3 Claims. (Cl. 252—79)

This invention relates to compositions of matter and more particularly to fluids adapted for use in hydraulically operated apparatus such, for example, as hydraulic brakes and the like. This application is a division of my pending application S. N. 412,609, filed September 27, 1941 (now abandoned).

It has previously been proposed to use various mixtures of blown vegetable, animal or marine animal oils and monohydric alcohols to actuate the pressure operated elements of hydraulic brake systems and similarly operated apparatus. The use of domestic vegetable, animal and marine animal oils in hydraulic fluids has long been desired because of their low cost, availability and constancy of supply. However, these oils swell rubber excessively compared to castor oil and are too little soluble in suitable solvents to be used without further modification. Various methods for modifying such oils by blowing and combining them with monohydric alcohols have previously been proposed. These proposed mixtures, however, have been characterized by numerous disadvantages, particularly high rubber swelling, low boiling point, high melting point, high viscosity at low temperatures and an undesirably wide change in viscosity under varying temperature conditions, all of which give rise to highly dangerous possibilities in connection with the operation of brake systems.

It is an object of the present invention to overcome the undesirable characteristics of previously proposed blown oil-monohydric alcohol fluids and particularly to produce from domestically available oils a cheap hydraulic fluid characterized by a lower freezing point and higher boiling point for a given rubber swelling. It is a further object of the invention to produce a blown oil composition characterized by lower viscosity at low temperatures and a more uniform viscosity over a wider range of temperature conditions.

Other objects and advantages of the invention will be apparent by reference to the following specification in which the invention is described in its preferred embodiments and details.

According to this invention, an improved blown oil fluid for use in hydraulically operated systems such as hydraulic brake systems is obtained by mixing a vegetable, animal or marine animal oil (including fish oils) containing unsaturated groups, which groups have been at least partially oxidized or blown, with an ether containing a hydroxyl group, the ether having not more than 8 carbon atoms per mole and preferably being an ether of a glycol. The products obtained by mixing such oils and ethers containing a hydroxyl group have greatly improved properties compared with blown oil-monohydric alcohol compositions previously proposed and are highly advantageous when used as hydraulic fluids either alone or in conjunction with other materials. Although these fluids contain ether groups which normally attack rubber considerably more than alcohols do and reduce the boiling point, nevertheless, these mixtures have been found to have lower rubber swelling for a given boiling point, have lower freezing point, lower viscosity at sub-zero temperatures and less change in viscosity with change in temperature than blown oil-monohydric alcohol fluids.

Although, according to this invention I may use any liquid blown oil of the animal or vegetable oil class, it is preferred particularly to use a domestically available oil which has been blown with air or oxygen to a Gardner-Holdt viscosity of 20–70 seconds at 25° C. Thus, for example, among the many blown oils which may be utilized according to this invention are: almond, blackfish, candlenut, castor, Chinawood, cod, corn, cottonseed, croton, grape seed, lemon seed, linseed, mustard seed, menhaden, olive, oiticica, orange seed, palm, peanut, perilla, porpoise, rapeseed, seal, sesame, shark, sperm, tallow, soyabean, sunflower, teaseed, tung, walnut, whale, and the like.

Any ether containing a hydroxyl group may be utilized for admixture with the blown oils of this invention, but monoglycol ethers having not more than 8 carbon atoms have been found preferable to polyglycol ethers. Likewise, the methyl ether of ethylene glycol, known commercially as Methyl Cellosolve, is the most desirable from the standpoint of low rubber swelling and low viscosity at low temperatures. Thus, for example, desirable hydraulic fluids may be obtained by mixing blown oils such as previously described with ethers containing a hydroxyl group such as the mono-n-propyl ether of ethylene glycol and the mono-iso-propyl ether of ethylene glycol, the mono and diethers of glycerol, the monoethers of ethylene glycol such as the isobutyl ether of ethylene glycol and those commercially known as "Cellosolve," Methyl "Cellosolve" and Butyl "Cellosolve," the monoethers of 1,2- and 1,3-propylene glycols, the butylene and isobutylene glycols, the amylene and the hexylene glycols and the like, as well as the ethers of polyglycols, such as isobutyl ether of diethylene glycol and those known commercially as "Carbitol," Methyl "Carbitol" and Butyl "Carbitol" and the monoethers of polyethylene glycols, di- and polypropylene glycols. All the specific ethers containing a hydroxyl group hereinbefore set forth are representative and illustrative only of the scope of this invention and are not to be taken as a limitation thereof.

These ethers may be mixed with varying proportions of a blown oil, as previously described, and mixtures of various ethers containing a hydroxyl group may also be employed, as well as mixtures of various blown oils. Variation of proportions of ether and oil may be made within a wide range to give valuable hydraulic fluids. Thus, for example, from 5 to 95% by weight of blown oil may be used per 95 to 5% by weight of ether, although preferably 25–50 parts of oil are mixed with 50–75 parts of ether.

These fluids exert little if any disadvantageous action upon the metallic parts with which they come in contact. If, however, slight corrosion of the metallic operating parts with which the fluids come in contact is perceived, I have found that this may be overcome by incorporation in my fluid of small quantities of alkali metal nitrites, or alkaline earth metal nitrites such as calcium and magnesium nitrites, or borax or chromates. The proportion of corrosion inhibitor to the hydraulic fluid proper may be widely varied but generally I prefer to utilize the inhibitor in relatively small quantities such as not greatly exceeding 10 to 40 grams of inhibitor per gallon of complete fluid.

As a further feature of this invention I have found that the addition of a small proportion of graphite, as such or in fluid suspensions, such as those known under the trade marked names "Castordag," "Aquadag," "Glydag," or the like, is often beneficial and improves the characteristics of the fluid, the proportions of graphite previously disclosed may be used in the range of from about 0.001 to 0.5% by volume of the total fluid. I have found that in actual operation inclusion of the graphite as part of the fluid of this invention results in reduced rubber attack, improved lubrication, lower solidification temperatures and decreased wear of metal and rubber parts.

Although the mixture of a blown oil and an ether as previously described is suited for and may be utilized alone as a hydraulic fluid, it may also, if desired, be mixed with a substance which effects a further lowering of the freezing point and viscosity of the complete hydraulic fluid. Various "organic solvent diluents" may be utilized for this purpose, according to this invention, such as alcohols of relatively low molecular weight, for example diacetone, methyl, ethyl, propyl, and isopropyl, butyl and isobutyl, and the amyl alcohols. Similarly, esters of relatively low molecular weight may be used, such as ethyl acetate and methyl propionate, and more particularly those esters containing hydroxyl groups, such as ethyl lactate, methyl tartrate, methyl glycolate, and the like. Likewise I may utilize soluble salts of organic acids of relatively low molecular weight such as sodium lactate, potassium tartrate, and the like.

The proportions of other solvents to glycol ether may vary over a wide range such, for example, as from about 30–70 parts by volume thereof per 70–30 parts of glycol ether.

The following examples illustrate compositions of this invention.

Example 1

Parts by volume

Blown castor oil _____ 35
Mono-methyl ether of ethylene glycol _____ 65

The free acid of the oil is neutralized with potassium hydroxide.

Example 2

Parts by volume

Blown soybean oil (Gardner-Holdt
  vis.=Z–4+) _____ 35
Mono-ethyl ether of ethylene glycol _____ 65

The free acid of the oil (acid No. 6 to 9) is neutralized with potassium hydroxide.

Example 3

Parts by volume

Blown castor oil _____ 35
Mono-ethyl ether of diethylene glycol _____ 65

The free acid of the oil is neutralized with potassium hydroxide.

Example 4

Parts by volume

Blown soybean oil (Gardner-Holdt
  vis. =Z–4+) _____ 35
Mono-butyl ether of ethylene glycol _____ 65

The free acid of the oil (acid No. 6 to 9) is neutralized with potassium hydroxide.

Example 5

Parts by volume

Blown corn oil (Gardner-Holdt vis. =40 secs.
  at 25° C.) _____ 35
Mono-ethyl ether of ethylene glycol _____ 65

The free acid of the oil (acid No. 6 to 12) is neutralized with potassium hydroxide.

Example 6

Parts by volume

Blown peanut oil (Gardner-Holdt vis. =40–50
  secs. at 25° C.) _____ 35
Mono-butyl ether of diethylene glycol _____ 65

The free acid of the oil (acid No. 5 to 12) is neutralized with potassium hydroxide.

Example 7

Parts by volume

Blown soybean oil (Gardner-Holdt
  vis. =Z–4+) _____ 40
Mono-methyl ether of ethylene glycol _____ 60

The free acid of the oil (acid No. 6 to 9) is neutralized with potassium hydroxide.

Example 8

Parts by volume

Blown corn oil (Gardner-Holdt vis. of 40–60
  sec. at 25° C) _____ 35
Monobutyl ether of diethylene glycol _____ 65

The free acid of the oil (acid No. 6–12) is neutralized with potassium hydroxide.

Example 9

Parts by volume

Blown corn oil (Gardner-Holdt vis. 40–60
  sec. at 25° C) _____ 40
Monomethyl ether of ethylene glycol _____ 60

The free acid of the oil (acid No. 6–12) is neutralized with potassium hydroxide.

By the term "free vegetable, animal or marine animal oil" as used in the claims is meant an oil uncombined chemically with any other substance.

Various changes may be made in the proportions and methods described without departing

I claim:

1. A hydraulic fluid for use in fluid operating apparatus consisting essentially of per 100 parts by weight, 50 to 75 parts of the monoethyl ether of ethylene glycol and from 50 to 25 parts of blown castor oil.

2. The hydraulic fluid of claim 1 which contains 30 to 70% by volume of a solvent of the group consisting of methyl, ethyl, propyl, isopropyl, butyl, isobutyl, amyl and diacetone alcohols.

3. A hydraulic fluid for use in fluid operated apparatus consisting essentially of a mixture of approximately 65 parts by volume of monoethyl ether of ethylene glycol and approximately 35 parts by volume of free, blown castor oil.

KENNETH E. WALKER.

REFERENCES CITED

The following references are of record in the file of this patent:

UNITED STATES PATENTS

| Number | Name | Date |
|---|---|---|
| 1,779,460 | Bagley | Oct. 28, 1930 |
| 1,984,421 | Muench et al. | Dec. 18, 1934 |
| 2,090,263 | Moses | Aug. 17, 1937 |
| 2,102,638 | Moses | Dec. 21, 1937 |
| 2,169,231 | Fife | Aug. 15, 1939 |
| 2,205,183 | Woodhouse | June 18, 1940 |
| 2,238,045 | Fulton | Apr. 15, 1941 |